United States Patent [19]

Goyette et al.

[11] Patent Number: 4,592,915
[45] Date of Patent: Jun. 3, 1986

[54] PROCESS AND COMPOSITIONS FOR STABILIZATION OF FORAGES

[76] Inventors: Lewis E. Goyette, 3806 Winding Way Rd., SW., Roanoke, Va. 24015; James F. Tobey, Jr., Rte. 2, Box 293B, Roanoke, Va. 24019

[21] Appl. No.: 498,320

[22] Filed: May 26, 1983

[51] Int. Cl.$^4$ .............................................. A23J 3/03
[52] U.S. Cl. .................................. 426/321; 426/331; 426/335; 426/532
[58] Field of Search ................ 426/321, 331, 335, 532

[56] References Cited

U.S. PATENT DOCUMENTS

| | | | |
|---|---|---|---|
| 2,562,970 | 8/1951 | Thompson | 426/311 |
| 3,624,222 | 11/1971 | Nelson | 426/532 X |
| 3,823,128 | 7/1974 | Bickoff et al. | 426/636 X |
| 4,042,716 | 8/1977 | Bertram et al. | 426/532 X |
| 4,199,606 | 4/1980 | Bland | 426/331 |
| 4,211,781 | 7/1980 | Chapman | 426/532 X |
| 4,223,045 | 9/1980 | Fink | 426/532 X |
| 4,346,118 | 8/1982 | Islam | 426/335 |
| 4,426,396 | 1/1984 | Young | 426/335 X |

OTHER PUBLICATIONS

Furia, T. E., "CRC Handbook of Food Additives", CRC Press, Inc., Cleveland, Ohio, 1972, pp. 129–141.

*Primary Examiner*—Robert Yoncoskie
*Attorney, Agent, or Firm*—John S. Roberts, Jr.

[57] ABSTRACT

This invention relates to the preservation of moist forage crops, high moisture grains, silages and haylages, brewer's wet and spent grains, distillers wet and spent grains and similar byproducts of fermentation used for animal feeding, and hays made from forage crops. In particular, this invention relates to the process by which these materials may be treated so as to prevent nutrient loss through excessive oxidative degradation and the concurrent heating therefrom.

This invention relates to solid and emulsified compositions containing preferably 6-ethoxy-2,2,4-trimethyl-1,2-dihydroquinoline, Ethoxyquin, the addition of sorbic acid or alkali metal sorbate and optionally a mix of an alkali metal propionate and an alkaline earth metal propionate, such as calcium propionate, and an alkali metal propionate, such as sodium propionate, and method for preparation of solid and emulsified compositions embodying the above.

15 Claims, No Drawings

PROCESS AND COMPOSITIONS FOR STABILIZATION OF FORAGES

MATERIAL INFORMATION DISCLOSURE

U.S. Pat. Nos. 2,562,970 Thompson and 3,823,128 Bickoff et al show the quinoline compound of the present invention for treatment of dry alfalfa.

*Encyclopedia of Chemical Technology*, Vol. 3, 3d edition, 1978, p. 140; and Vol. 19, 3d edition, 1982, pp. 545–546, refer to the use of the compound of the present invention, ethoxyquin.

BACKGROUND AND GENERAL DESCRIPTION

Most forages in the United States and in western Europe are stored or preserved by one of two methods: by drying the forage and bailing or stacking thereof; or by storing in their original moist state under oxygen limiting conditions. In the first case, the forage crop is cut and allowed to rest in the field. The crop may be mechanically conditioned or raked into windows to further facilitate natural evaporation of the moisture contained therein. If the forage crop is baled or stored before the evaporation process has progressed enough, there are several problems that could result. The mechanical handling or baling equipment may not even handle the forage that is too heavy or wet from excessive moisture. If the crop is successfully stored or baled and stacked in an enclosure, the oxidative degradation and heat produced therefrom, in the presence of the aforementioned excessive moisture, could result in deterioration of proteins and other important nutrients in the crop or even could result in enough heat production to cause storage facilities to burn. The presence of excessive moisture can destabilize baled hay and forages also by inducing the natural molds which occur on the surface of any forage to grow. These molds may produce harmful toxins or may reduce the palatability of the crop. However, if the forage crop is subjected to drying conditions for too long a time, then other deleterious conditions may result. Most of the beneficial plant proteins and other important nutrients are stored in the leaves of forage crops. Excessive wilting, drying, and mechanical conditioning results in the loosening of the leaves and loss when the crops are baled or picked up from the field. The resulting stored forage will assuredly be inferior in nutritional quality due to the loss of the above nutrients.

In the case of forage crops stored in oxygen limiting environments, there are several conditions that may result in oxidative deterioration of the stored forage. During the filling of silos or other holding vessels for the containment of silages, there is often a period of time when the vessel is left uncovered or unsealed since silos often cannot be filled to completion in one day. During the fermentation which occurs in stored moist forages under oxygen limiting conditions, lactic acid is produced by microflora of the forages resulting in general preservation of most of the ensiled forage mass because of the acidification effect. However, at the surface(s) of the mass of the ensiled forage it is common to note very serious oxidative spoilage occurring due to increased exposure to air. Losses due to surface spoilage in silos can be very serious. Oftentimes several tons of ensiled crops are deemed useless and must be discarded.

DESCRIPTION OF THE INVENTION

As a most important active ingredient, this invention relates to the utilization of a compound of the formula:

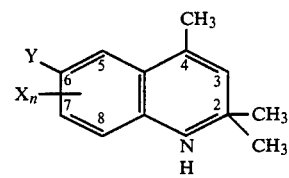

where
Y=$OC_2H_5$, H
X=halogen (i.e., Cl, Br, or I) or hydrogen (H)
n=1–3

This invention includes the following ingredients designed to be used either as a solid or as an emulsifiable liquid combination.

The Active Ingredients

Greatly preferred is the use of 6-ethoxy-2,2,4-trimethyl-1,2-dihydroquinoline as an antioxidant or stabilizer for moist forages. Preferred dosage in weight percent ranges from 0.00025 to 0.015%. This compound, known as ethoxyquin or Santoquin (Monsanto) is preferred in its class due partly because the Agriculture Department allows 150 ppm in the finished product. Comparable alternative related compounds are 2,2,4-trialkyl-1,2-dihydroquinolines where there is a substitution in the A ring of halogen, i.e., chlorine, bromine, or iodine, as, for example, 7-chloro-2,2,4-trimethyl-1,2-dihydroquinoline, and the parent compound of ethoxyquin, where H is substituted for the ethoxy.

A second active ingredient is sorbic acid ($CH_2$:$C_2CH$:$CHCOOH$) or alkali metal salt thereof, such as sodium or potassium sorbate, in the broadcast dosage by weight percent of 0.00025–0.10.

A third active ingredient is a propionate inhibitor, such as an alkaline earth metal propionate exemplified by calcium propionate ($CaCH_2CH_2COO)_2Ca$ and/or an alkali metal propionate exemplified by sodium propionate; said propionate or a mixture thereof is utilized in a broadcast dosage in weight percent of 0.00025–0.2.

In the above, the propionate was used as a mold inhibitor. The potassium sorbate or sorbic acid is utilized in moist feeds as a fungicide. Additionally, the propionate compounds have maximum efficiency below pH of 4.0 while the alkali metal sorbate, e.g., potassium or sodium sorbate, and sorbic acid are a most effective inhibitor of yeast at pH 4.0–6.0.

In some cases the above ternary composition of quinoline, propionate, and sorbate or sorbic acid may be reduced to a binary composition, eliminating the propionate and effecting good results especially in a forage environment where the milieu is not very acid; i.e., below pH 4.0.

Inactive Ingredients—Solvents and Fillers

It has been discovered that as a solvent, an alkylene glycol, such as propylene glycol, is preferred. This substance has moderate anti-microbial effect and acts as an effective solvent and carrier for the 6-ethoxy-2,2,4-trimethyl-1,2-dihydroquinoline-sorbate combination. Of other operable solvents it is noted ethylene glycol and lower $C_1$-$C_6$ alkanols, such as ethanol, may be utilized.

In addition, the propionate component is insoluble in the liquid emulsion compositions described later and is omitted from these liquid compositions.

In what might be termed the inactive components of the present invention to produce a dry mixture there is used a clay, such as smectite-vermiculite and/or absorptive vegetative materials, such as ground corncobs, distiller's dried grains, wheat middlings, ground peanut hulls, etc., which may be termed extenders or compounding agents. These materials are used in high percentiles in many of the examples.

One particularly novel aspect of this invention is that the dry mixture of materials which may be used in the process is manufactured by utilizing smectite-vermiculite (10–60%) and/or absorptive vegetative materials, such as ground corncobs or distiller's dried grains (60–10%), wheat middlings, ground peanut hulls, etc., as extenders and compounding agents. This allows for the absorption of the liquid 6-ethoxy-2,2,4-trimethyl-1,2-dihydroquinoline onto the compounding material and assists in the distribution of relatively small amounts of the active agents to be evenly distributed throughout the forages or moist feeds. Extending or mixing concentrates into premixes to allow for better distribution is not novel in itself; however, in many cases, the effectiveness of the ultimate dilution is limited by the finite number of active ingredient particles among the inert diluent. In this case the absorptive nature of the extender allows the active ingredient to be fully spread over the total number of extender particles making the distribution in feedstuffs much more effective and economical by increasing the number of active ingredient containing particles.

In addition to the above preferred components of smectite-vermiculite clay and distiller's dried grains, a substantial quantity of an extender of salt or sodium chloride may be used.

The process may be slightly modified depending upon the method of application onto the feedstuffs material as to the type of feedstuff and the particular nature of the deterioration problem in that particular material. For example, in ensilage which is held in oxygen-limiting environment, the main problem of oxidative spoilage occurs on the surface of the ensiled mass, particularly in the case of silage housed in an upright silo. In this case, the process would involve only surface treatment in the forage at time of ensiling and treating to a typical depth of 3–4 feet (1 meter) since this is the amount of silage that usually spoils. In silos where deeper spoilage layers are encountered, more treatment may be necessary.

In the case of bailed hays where the oxidative degradation of the forage and concurrent occurrence of molds is often throughout the forage mass, this invention involves treating the entire bailed mass by incremental feeding of, or spraying of, one of the acceptable formulae below onto the forage as it is picked up and bailed. This process works in the conventional square bale, typically weighing 35–45 pounds and in the more contemporary round bails weighing up to one ton each.

Recently there has been more widespread use of brewer's or distiller's wet or spent grains left over from the brewing of beer and distillation of grain spirits. With the high cost of fuels, instead of drying the byproducts, manufacturers of these types of grain products have begun to deliver them directly to livestock facilities. Spoilage of these products can be a serious problem, particularly during warm weather, destroying nutritive value of the products due to oxidative processes, bacterial and mold action, and heat therefrom. This invention helps to control oxidative degradation and spoilage when the wet spent grains are stored without refrigeration. As can be seen in Table 1 below, using the ternary active material of ethoxyquin (Formula A), i.e., propionate and potassium sorbate, the simple utilization of this invention and covering the wet spent grains with plastic can result in dramatic saving of feeding value.

The aforementioned mixture (Formula A) may be manufactured as a granulated solid product or as an emulsifiable liquid which can be applied through any conventional percentage feeder, broadcasting equipment, or liquid spraying or dispersal equipment onto the surface of forages and feed substances as listed above. Because of the anti-oxidant nature of the 6-ethoxy-2,2,4-trimethyl-1,2-dihydroquinoline, the corrosive properties of conventional acidifiers and mold inhibiting acids are avoided.

Dosage

The dosage for the compositions is utilized at 0.5–10.0 lbs/T in the dry state and as a water emulsifiable liquid it is applied at rates of 0.5–2.5 lbs/T. Calculated for the individual components, the dosage for the solid compositions is 0.00025–0.015 percent of the 6-ethoxy-2,2,4-trimethyl-1,2-dihydroquinoline or related compound, 0.00025–0.10 percent of alkali metal sorbate such as potassium sorbate and sorbic acid and, where utilized, 0.00025–0.2 percent alkali metal and/or alkaline earth metal propionate. In the liquid compositions where an emulsion of water and glycol is used, the calcium propionate is eliminated due to difficulties of precipitation of the salt.

In the particular compositions utilized it has been noted that the smectite-vermiculite/distillers' dry grains could vary from 10–60 to 60–10% and to that must be added a substantial amount of the inactive sodium chloride. A sample percentile for Formula A is given below in Table 1. The active ingredients within the composition may vary for the quinoline compound from 1–5%, the sorbic acid or sorbate 1–7.5% and the propionate 1.25–6.0%. It is to be noted that these percentiles are different from those cited above for the purpose of broadcasting a dosage.

EXAMPLE 1

This process was tested in laboratory and in full scale tests on various types of forages with moderate moisture levels in the range of 22% to 45%. To prove the effectiveness of this invention, up to 50 tons of hay was treated in each trial.

Table 1 shows the effects of the use of this invention in certain concentrations throughout the mass of hay forages and haylages.

TABLE 1

Formula A - ternary active composition (by weight percent)

- 35.0% Smectite-vermiculite
- 34.25% Sodium chloride
- 25.0% Distiller's dried grains
- 2.5% 6-ethoxy-2,2,4-trimethyl-1,2-dihydroquinoline
- 2.0% Calcium propionate
- 1.25% Potassium sorbate

| Product Formula | Conc. Applied Manner Applied | Feedstuff Type | Conc. Water | Effects Noted |
|---|---|---|---|---|
| A | 3 lb/ton calibrated percentage feeder | Fresh alfalfa forage | 32–35% | Temperatures 10–15° C. lower than in control bale; mold mycelial growth less than control |
| A | 3 lb/ton calibrated percentage feeder | Fresh rye forage | 40–45% | Temperatures remained at 35–40° C. while control bales exceeded 55° C. Control bales charred from heat while treated bales remained green |
| A | 3 lb/ton calibrated percentage feeder | Grass (mixed bermuda and timothy) | 25–30% | Treated bales remained 15–20° C. cooler than control bales and did not exhibit excessive mold growth. Control bales were discarded because of mold |
| A | 5 lb/ton | Fresh grass forage (brome and lespedeza) | 22–30% | Results were same as in trial immediately above |
| A | 5 lb/ton | Fresh alfalfa | 32–35% | Round bales that were treated remained cooler in temperature (10–15° C.) than the control bales; when bales were opened after 6 months, control bales were brown inside indicating charring; treated bales were still green |
| A | 5 lb/ton | Moist grass (orchard and ryegrass) | 30–35% | Treated bales stayed cool and free of mold; untreated bales caught fire |

EXAMPLE 2

Table 2 below shows the effectiveness and limitations of various modifications of the composition of the mixture in a laboratory environment. The forages and feedstuffs were collected from the field, were immediately brought to the laboratory, and were rapidly frozen for preservation until time of testing. Lots weighing 5 pounds each were mixed thoroughly by hand with the tested product and were placed in a 12″×18″ (3 mil thickness) polyethylene bag with temperature monitoring sensors imbedded in the center mass of each lot. When the various formulations were tested against single known mold inhibitors, the mold inhibitors were formulated to similar levels of active ingredients with sodium chloride. The invention was tested on rye and alfalfa as well as spent brewers' grains in this manner. Those results indicated are with rye. The other results not reported here were essentially the same under conditions similar to those results reported in Table 2.

TABLE 2

| | | |
|---|---|---|
| Formula A | ternary active formula above | |
| Formula B | 35.0% | Smectite-vermiculite |
| | 34.25% | Distillers' dried grains |
| | 25.0% | Sodium chloride |
| | 2.5% | 6-ethoxy-2,2,4-trimethyl-1,2-dihydroquinoline |
| | 2.0% | Calcium propionate |
| | 1.25% | Sorbic acid |
| Formula C | 35.0% | Smectite-vermiculite |
| | 34.0% | Distillers' dried grains |
| | 25.0% | Sodium chloride |
| | 2.5% | 6-ethoxy-2,2,4-trimethyl-1,2-dihydroquinoline |
| | 3.5% | Potassium sorbate |
| E = | 6-ethoxy-2,2,4-trimethyl-1,2-dihydroquinoline (technical grade) | |

| Product Formula | Rate Used % by wt. (lb/T) | Mold Control | Heating Control | Protein Preservation Improvement | Color |
|---|---|---|---|---|---|
| A | 0.25% (5.0) | + | + | +3.1% | Light green brown |
| A | 0.15% (3.0) | +/− | + | +2.5% | Light green brown |
| A | 0.10% (2.0) | − | + | +0.9% | Tan |
| 6% Sorbic Acid | 0.25% (5.0) | + | | +0.3% | Tan |
| 6% Calcium Propionate | 0.25% (5.0) | +/− | − | 0.0 | Tan |
| 6% Sodium Propionate | 0.25% (5.0) | +/− | − | 0.0 | Tan |
| 6% E | 0.25% (5.0) | − | + | +1.8% | Brown/green |
| B | 0.25% (5.0) | + | + | +4.1% | Green |
| B | 0.15% (3.0) | + | + | +3.1% | Green |
| B | 0.10% (2.0) | +/− | + | +1.3% | Brown/green |
| C | 0.25% (5.0) | + | + | +3.3% | Tan/green |
| C | 0.15% (3.0) | +/− | + | +1.7% | Tan/green |
| C | 0.10% (2.0) | − | + | +0.9% | Tan/green |
| CONTROL | − | − | − | − | Brown |

+ positive improvement
+/− variable results
− no improvement

Additional experiments were run in the laboratory, varying the levels of smectite/vermiculite and distillers' dried grains. Little significant difference in results was obtained as long as the proportions were kept in the range of 10% smectite-vermiculite and 60% distillers' dried grains to 60% smectite-vermiculite and 10% distillers' dried grains. Peanut hulls, corncob and corn grits were utilized as fillers with results which range from fair to good. These examples of extenders are used as exemplary of absorptive suitable vegetable matter for formulation of the product.

EXAMPLE 3

Field trials were run on various types of silages using surface treatment of the ensiled material in an attempt to prevent excessive surface spoilage that often occurs in silage. Table 3 relates the results of treating these silages which were stored under oxygen limiting conditions.

Table 3 reports the results of the invention as it was applied to the portion of various silages that normally spoil upon storage without treatment.

TABLE 3

Formula A - ternary active composition (by weight percent) - see Table 1

| Product Formula | Conc. Applied % by Weight | Feedstuff Type | Conc. Water | Effects Noted |
|---|---|---|---|---|
| A | 0.25% Incorporated into 12" top surface of upright silo & covered w/plastic | Corn silage | 60–65% | Insignificant spoilage noted on surface in treated silo; untreated had 36" spoilage in 3–6 months |
| A | 0.25% | High moisture shelled corn (unrolled) treated at time of silo opening | 25–33% | No mold noted in treated corn while within 5 days of opening untreated corn was thoroughly covered with mold |
| A | 0.1% Incorporated into top one foot of half of the bunker type silo; all surface covered w/plastic | Rye silage | 65–75% | Only 1" spoilage on surface of treated silage while 12" spoilage was common in control silage |
| A | 1 lb/50 sq.ft. of surface of ensiled grains sprinkled on surface and covered with plastic | Ensiled wet (spent) brewers' grains | 75–80% | No spoilage in treated area; 6 inches of spoilage on surface of untreated area |

EXAMPLE 4

Many operators of bailing equipment prefer to apply mold inhibitors, preservatives, and aids to fermentation through liquid spray and wettable slurry application equipment. The invention has also been adapted in such a way as to provide an emulsifiable liquid which can be applied in conventional liquid applicators without the effects of excessive corrosion that are normally seen with propionic acid or anhydrous ammonia application. By utilizing the solvent propylene glycol, potassium sorbate or other sorbic acid salts or sorbic acid may be made soluble and also compatible with commercially available 70% emulsifiable form of 6-ethoxy-2,2,4-trimethyl-1,2-dihydroquinoline. The resulting mixture readily forms a stable emulsion when added to water at a rate of 8 oz. to 64 oz. per gallon of water. Experiments were executed utilizing the following contents of active ingredients:

50.0–90.0% Propylene glycol
5.5–18.0% Santoquin ® emulsion (70% Technical 1,2-dihydro-6-ethoxy-2,2,4-trimethylquinoline emulsifiable concentrate)
5.0–30.0% Potassium sorbate The balance of the formulation may be water.

Sorbic acid may be used in a liquid formulation but is much less soluble than potassium sorbate and thus does not allow a very concentrated form of sorbate to be prepared without precipitation.

The following Table 4 describes the results obtained when applying a liquid emulsion as described above. In Formulas F and G, variation was made in the percentile of potassium sorbate and it was noted that Formula G doubled the percentile of Santoquin ® emulsion and potassium sorbate over Formula F and was more effective. Santoquin ® Emulsion is 70% ethoxyquin emulsion (Monsanto).

In Table 4 the percent applied is the dosage of the formulations noted which is applied and the percentile of each of the components of the formulation is set out below in the specific formula as in Formula F and Formula G.

TABLE 4

|  | Formula F | Formula G |
|---|---|---|
| Propylene glycol | 75.0% | 60.0% |
| Water | 10.0% | 10.0% |
| Santoquin ® emulsion | 7.5% | 15.0% |
| Potassium sorbate | 7.5% | 15.0% |

Formula H = Santoquin ® emulsion (70% ethoxyquin emulsion)

| Formulation | Crop | % Applied | Results Obtained |
|---|---|---|---|
| F | Alfalfa (25–29% moisture square bales) | 0.05 | Less mold, color greener, 10° C. lower temperature than untreated |
| F | Rye Round bales | 0.06 | Less mold, color greener, 10° C. lower temperature than untreated |
| G | Alfalfa | 0.06 | Less mold, color greener, 10° C. lower temperature than untreated |
| G | Alfalfa | 0.03 | Greener color, 8° C. lower temperature than untreated |
| 10% Propionic (commercial product) | Alfalfa | 0.2 | Yellow color, little temp. control |
| H | Alfalfa | 0.02 | 8° C. lower temp.; very little mold inhibition |
| Sorbic acid | Alfalfa | 0.01 | Very little diff. from control |
| Potassium sorbate | Alfalfa | 0.02 | Very little diff. from control |

*The dosage of individual components for sorbate tested approximately equals the dosage applied for the active ingredients in Formulations F and G.

The product described as being part of the novel process in the above trials was applied by mixing 16 fluid ounces (1 pint) of the formulation into enough water to give satisfactory coverage on one ton of the hay crop (usually 1 pint added to 1 gallon of water).

It was noted that the formulations listed above are examples of two modes of application and are much more effective than respectively greater concentrations of the individual active ingredients used alone and the novel process is much more effective than the use of a commercial propionic acid product. It was also noted that the liquid formulations were effective in the laboratory in helping to control heating, maintaining natural green coloration, and to a lesser degree, molding in haylages, spent brewers' and distillers' grains, etc.

As a definition for moist forage crops and the like and related compositions are included high moisture grains, silages, haylages, brewers' wet and spent grains, distillers' wet and spent grains, byproducts of fermentation used for animal feeding and hays made from forage crops.

We claim:

1. A process for stabilizing against oxidation and mold growth a feedstuff selected from the group consisting of (1) silage, forage or grain, or high moisture grain; (2) baled hay of grasses or alfalfa; and (3) distillers wet or spent grains by adding to said feedstuff with blending a granulated composition comprising 1.0% to 5.0% of the compound

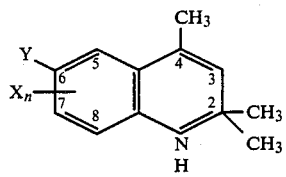

where
Y=OC$_2$H$_5$, H
X=Cl, Br, I or hydrogen
n=1-3
1.25% to 6.0% of an alkali metal or alkaline earth metal propionate, and 1.0% to 7.5% of sorbic acid or an alkali metal salt thereof, and the balance to 100% of inactive ingredients, said composition added to said foodstuff in amounts to provide a final level of individual ingredients in the amounts of quinoline compound 0.00125 to 0.00625%, sorbate 0.002 to 0.005% and propionate 0.00125 to 0.00375%, all percentages weight percent based on said foodstuff.

2. The process according to claim 1 wherein the compound is 6-ethoxy-2,2,4-trimethyl-1,2-dihydroquinoline.

3. The process according to claim 1 wherein the feedstuff are silage forage or grain.

4. The process according to claim 1 wherein the feedstuff are baled hay of annual or perennial grasses or alfalfa having from 22 to 45% moisture.

5. The process according to claim 1 wherein the feedstuff are distillers' wet or spent grains having from 25 to 80% moisture.

6. A process for stabilizing against oxidation and mold growth a feedstuff selected from the group consisting of (1) silage, forage or grain, or high moisture grain; (2) baled hay of grasses or alfalfa; and (3) distillers wet or spent grains by adding to said feedstuff with blending a liquid composition comprising 1.0% to 5.0% of the compound

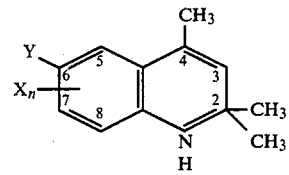

where
Y=OC$_2$H$_5$, H
X=Cl, Br, I or hydrogen
n=1-3
and 1.0% to 7.5% of sorbic acid or an alkali metal salt thereof, and the balance to 100% of inactive ingredients, said composition added to said foodstuff in amounts to provide a final level of individual ingredients in the amounts of quinoline compound 0.00125 to 0.00625% and sorbate 0.002 to 0.005%, all percentages weight percent based on said foodstuff.

7. The process according to claim 6 wherein the compound is 6-ethoxy-2,2,4-trimethyl-1,2-dihydroquinoline.

8. The process according to claim 6 wherein the feedstuff are silage forage or grain.

9. The process according to claim 6 wherein the feedstuff are baled hay of annual or perennial grasses or alfalfa having from 22 to 45% moisture.

10. The process according to claim 6 wherein the feedstuff are distillers' wet or spent grains having from 25 to 80% moisture.

11. A composition useful for stabilizing against oxidation and mold growth a feedstuff selected from the group consisting of (1) silage, forage or grain; (2) baled hay or alfalfa, and (3) distillers wet or spent grains comprising in weight percent about:
1.00–5.0% 6-ethoxy-2,2,4-trimethyl-1,2-dihydroxyqunoline
1.25–6.0% calcium propionate
1.00–7.5% potassium sorbate
10.0–60% smectite-vermiculite
25.0–35 % sodium chloride
60.0–10 % distillers' dried grains,
when added to said foodstuff in amounts to provide a final level of individual ingredients in the amounts of quinoline compound 0.00125 to 0.00625%, sorbate 0.002 to 0.005% and propionate 0.00125 to 0.00375%, all percentages weight percent based on said foodstuff.

12. The composition according to claim 11 wherein the weight percentages are about:
(A)
2.5 % 6-Ethoxy-2,2,4-trimethyl-1,2-dihydroxyqunioline
2.0 % Calcium propionate
1.25% potassium sorbate
35.0 % smectite-vermiculite
34.25% sodium chloride
25.0% Distillers' dried grains.

13. A composition effective for stabilizing against oxidation and mold growth a feedstuff selected from the group consisting of (1) silage, forage or grain, (2) baled hay or alfalfa, and (3) distillers wet or spent grains comprising in weight percent about:
50.0–90% alkylene glycol
5.5–18% compound according to the following formula:

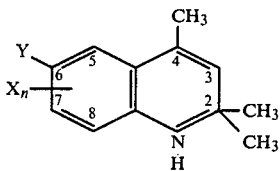

where
Y=OC₂H₅, H
X=Cl, Br, I or hydrogen
n=1-3
5.0-30% sorbic acid or alkali metal sorbate when added to said foodstuff in amounts to provide a final level of individual ingredients in the amounts of quinoline compound 0.00125 to 0.00625%, sorbate 0.002 to 0.005% and propionate 0.00125 to 0.00375%, all percentages weight percent based on said foodstuff.

14. The agricultural composition according to claim 13 wherein the weight percentages are about:
75% propylene glycol
7.5% compound according to the following formula:

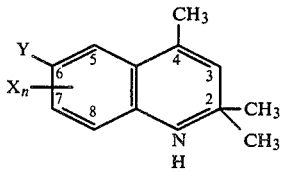

where
Y=OC₂H₅, H
X=halogen (i.e., Cl, Br, or I) or hydrogen
n=1-3
7.5% sorbic acid or alkali metal sorbate
10.0% water 15. The composition in a liquid carrier according to claim 13 wherein the alkylene glycol is propylene glycol, the quinoline compound in the formula is 6-ethoxy-2,2,4-trimethyl-1,2-dihydroquinoline emulsifiable concentrate and wherein the sorbic acid or alkali metal sorbate is potassium sorbate.

* * * * *